Oct. 26, 1965　　F. BARANOWSKI, JR　　3,213,708
CONTROL MECHANISM
Filed Sept. 13, 1963　　3 Sheets-Sheet 1

INVENTOR.
FRANK BARANOWSKI, JR.
BY
Isidore Match
ATTORNEY

Oct. 26, 1965   F. BARANOWSKI, JR   3,213,708
CONTROL MECHANISM
Filed Sept. 13, 1963   3 Sheets-Sheet 2
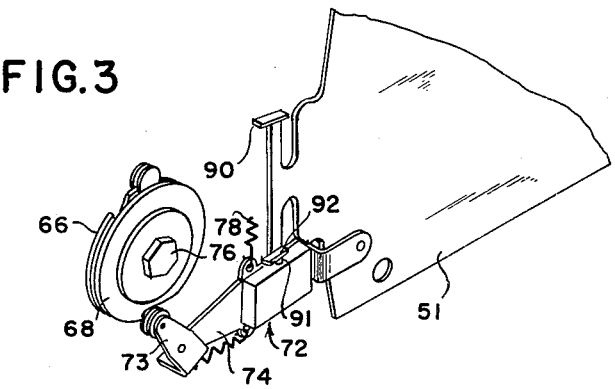
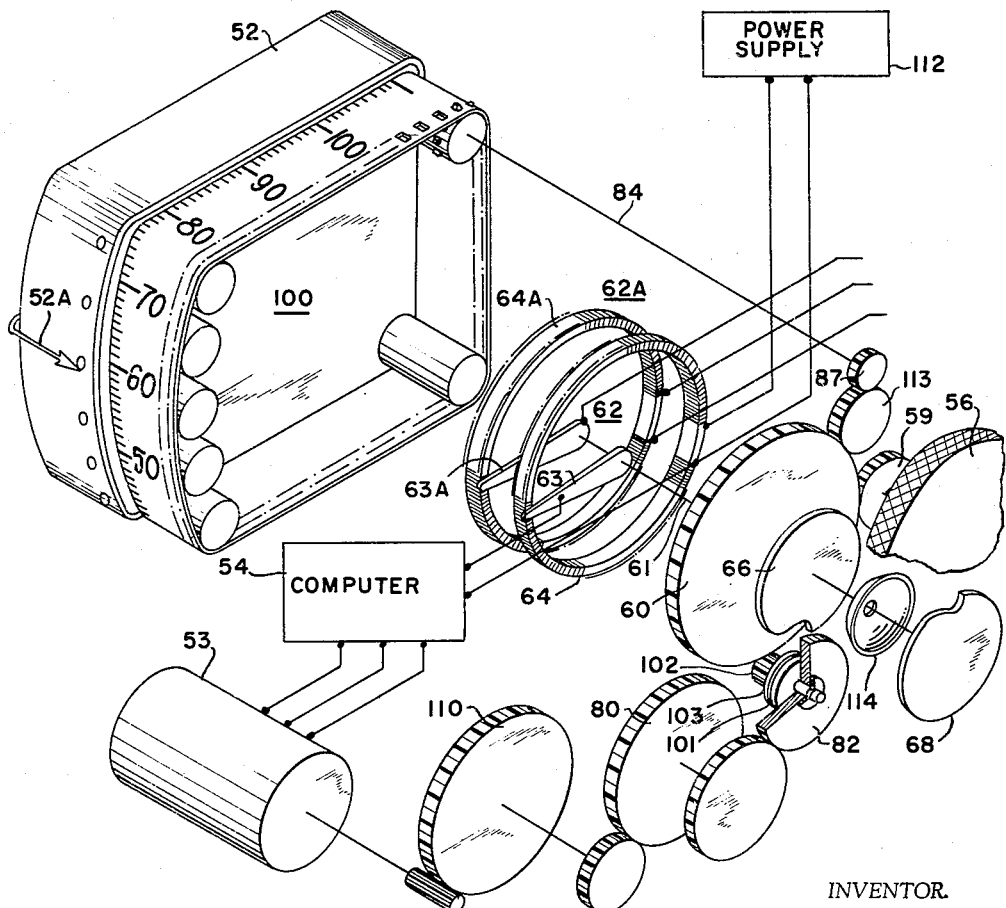
INVENTOR.
FRANK BARANOWSKI, JR.
BY Isidore Match
ATTORNEY Oct. 26, 1965    F. BARANOWSKI, JR    3,213,708
CONTROL MECHANISM
Filed Sept. 13, 1963    3 Sheets-Sheet 3
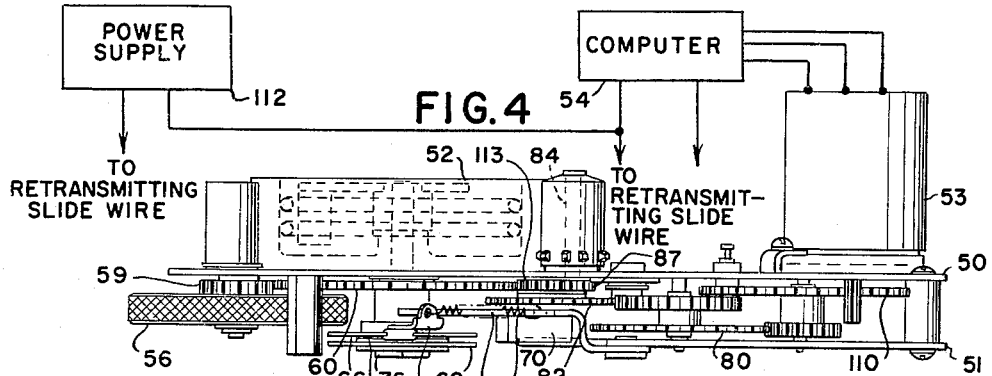
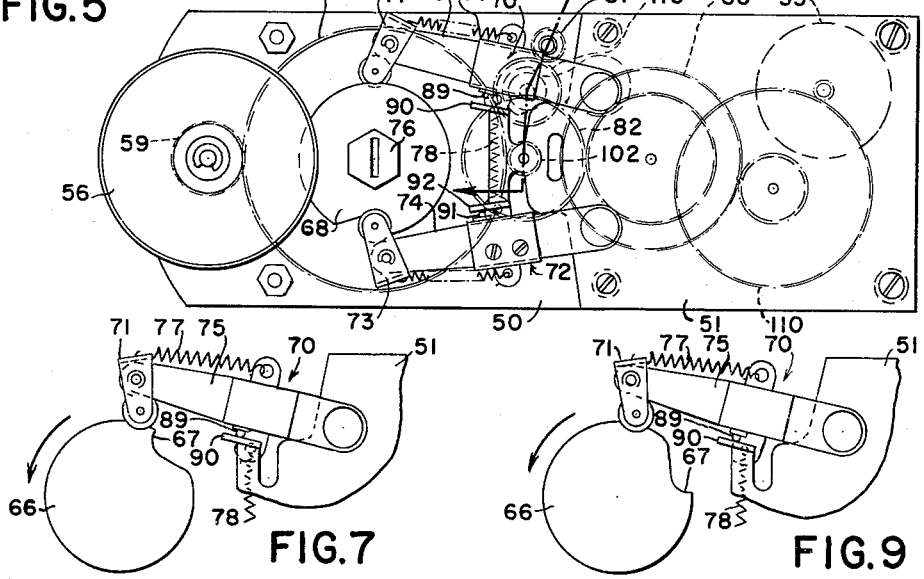
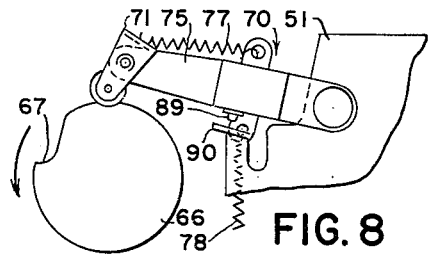
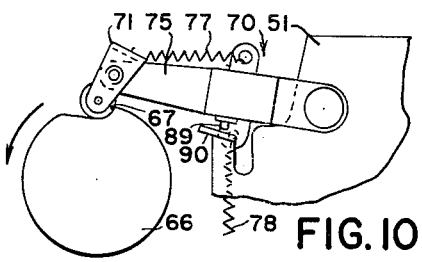
INVENTOR.
FRANK BARANOWSKI, JR.
BY
Isidore Match
ATTORNEY

United States Patent Office 3,213,708
Patented Oct. 26, 1965

3,213,708
CONTROL MECHANISM
Frank Baranowski, Jr., Lynnfield Centre, Mass., assignor to General Electric Company, a corporation of New York
Filed Sept. 13, 1963, Ser. No. 308,862
8 Claims. (Cl. 74—625)

This invention relates to control mechanisms. More particularly, it relates to a control mechanism advantageously adaptable for use in automatic control systems which may be monitored by human operators.

In electrical automatic process control systems, a common procedure is to compare a voltage representing a process variable with a voltage representing a control set point, the difference signal resulting from such comparison being utilized to control the process at the set point. Such automatic control systems generally include an analog or digital computer in a closed loop system, the output of which computer may be utilized to automatically vary the set point in accordance with the demands of the process dynamics. Generally, the set point voltage is one developed on a potentiometer, such set point voltage suitably appearing on a slide wire and brush assembly type potentiometer. The automatic varying of the set point voltage may be effected by a motor which is actuated by the output of the computer and which effects the movement of the brush on the potentiometer.

In many situations, it is desired that an operator have control of the varying of the set point whereby means are included for changing the set point by moving the brush by a manual arrangement.

It has been found that it is desirable in a computer controlled set point determining arrangement that there be combined with such computer control, the enabling of the overriding of the computer's control by the control of an operator who can adjust the set point manually or who can interrupt the computer's control through the motor. It has also been found that it is desirable to include means for automatically effecting upper and lower limits of the set point, i.e., the upper and lower limits respectively to which the brush may be moved on the slide wire potentiometer. In some situations wherein it may not be particularly necessary to halt slide wire movement at such upper and lower limits, it may at least be desired that indications be provided such as by an alarm or other device that an alarm point has been attained and perhaps passed by the brush. It has also been found that it is desirable to be able to accurately set the upper and lower limits of the set point whereby delicacy of control of the process is appreciably enhanced.

Accordingly, it is an important object of this invention to provide a mechanism adaptable for use in an automatically controlled process system to control the position of the set point on a control potentiometer such as a slide wire and brush assembly, such mechanism permitting an overriding of the automatic control by manual control.

It is a further object to provide a mechanism in accordance with the preceding objects which enables the restricting of the range over which the aforesaid set point may be varied and for imposing an upper and a lower limit on such set point.

It is another object to provide mechanism in accordance with the preceding objects in which there is enabled the automatic movement of the brush beyond limits or alarm points with the providing of annunciating indications when such limits or points are attained.

It is still a further object of this invention to provide a mechanism in accordance with the preceding objects in which the mechanism operates in only one direction with respect to one limit.

It is still another object to provide a mechanism in accordance with the preceding objects in which there is enabled great precision in the predetermining of the aforesaid upper and lower limits.

Generally speaking and in accordance with the invention, there is provided a control mechanism which is adaptable for use in the automatic controlling of a set point in a process control system. The mechanism comprises an arrangement in which a motor which is driven by the output of a computer or like system through a motor and gearing arrangement varies the set point on a control potentiometer in accordance with the output of the computer. A manually controllable knob which has a gearing arrangement associated therewith may also be utilized by an operator to vary the set point on the control potentiometer. The gearing arrangement associated with the control knob is operatively associated with the gearing arrangement of the motor through a clutch device whereby the turning of the motor effects the turning of the control knob. The clutch is constructed such that if the motor actuated knob movement is halted by an operator, the clutch device is caused to slip whereby the movement of the motor translated through the gearing arrangement associated therewith does not effect the movement of the slide wire and brush assembly associated with the potentiometer and consequently the halting of the knob enables an overriding of the effect of the control computer through the motor. A pair of cams are included for enabling the imposing of an upper and lower limit on the movement of the slide wire and brush assembly thereby restricting the range through which the set point can be varied between these upper and lower limits. Associated with the cams are upper and lower limits switches having cam follower arms adapted to be received in appropriate notches in the cams, the notches being so contoured that in one aspect of a cam, the receipt of the follower actuator arm in its notch halts the rotation of the cam and concurrently causes the production of an indication of such halting and in its reverse aspect, when the cam follower arm of its associated limit switch is received in its notch, the rotation of the cam is not halted but there is still produced the indication of the attaining of a limit or alarm point on the potentiometer. A tape is included which is comparatively long and has a scale thereon for indicating the position of the set point. The tape is adapted to be concurrently movable with the movement of the slide wire and brush assembly by the motor or by the manual control knob and its substantially long length enables the precise setting of the cams to enable a delicate selection of desired upper and lower limits of the set points. The cams are suitably arranged whereby they can be singly adjusted without disturbing each other's position.

The novel features, which are believed to be a characteristic of this invention are set forth with particularity in the appended claims. The invention itself, however, both as to its organization and method of operation, together with further objects and advantages thereof may best be understood by reference to the following description when taken in connection with the accompanying drawings.

In the drawings, FIG. 1 is a schematic depiction of a process control arrangement which includes therein a potentiometer whereat there is produced a control set point;

FIG. 2 is an exploded three dimensional view of a control mechanism constructed in accordance with the principles of the invention for varying the set point in the set point potentiometer of the system of FIG. 1;

FIG. 3 is a three dimensional view of the cam and associated limit switch arrangement employed in the control mechanism of FIG. 2;

FIG. 4 is a plan view of the control mechanism of FIG. 2;

FIG. 5 is a side elevational view of the control mechanism of FIG. 2;

FIG. 7 is a diagram which illustrates the coaction in the control mechanism of a cam and its associated limit switch when the switch is non-actuated, the position of the cam being such that the cam rotation is not halted when the cam follower arm of the limit switch is received in the cam notch;

FIG. 8 is a diagram similar to that of FIG. 7 in which the limit switch is actuated;

FIG. 9 is a diagram similar to that of FIGS. 7 and 8 which illustrates the coaction of the cam and its associated limit switch when the switch is non-actuated, the position of the cam being such that cam rotation is halted when the cam follower arm of the limit switch is received in the cam notch; and FIG. 10 is a diagram similar to that of FIG. 9 in which a limit switch is actuated.

Figure 1:
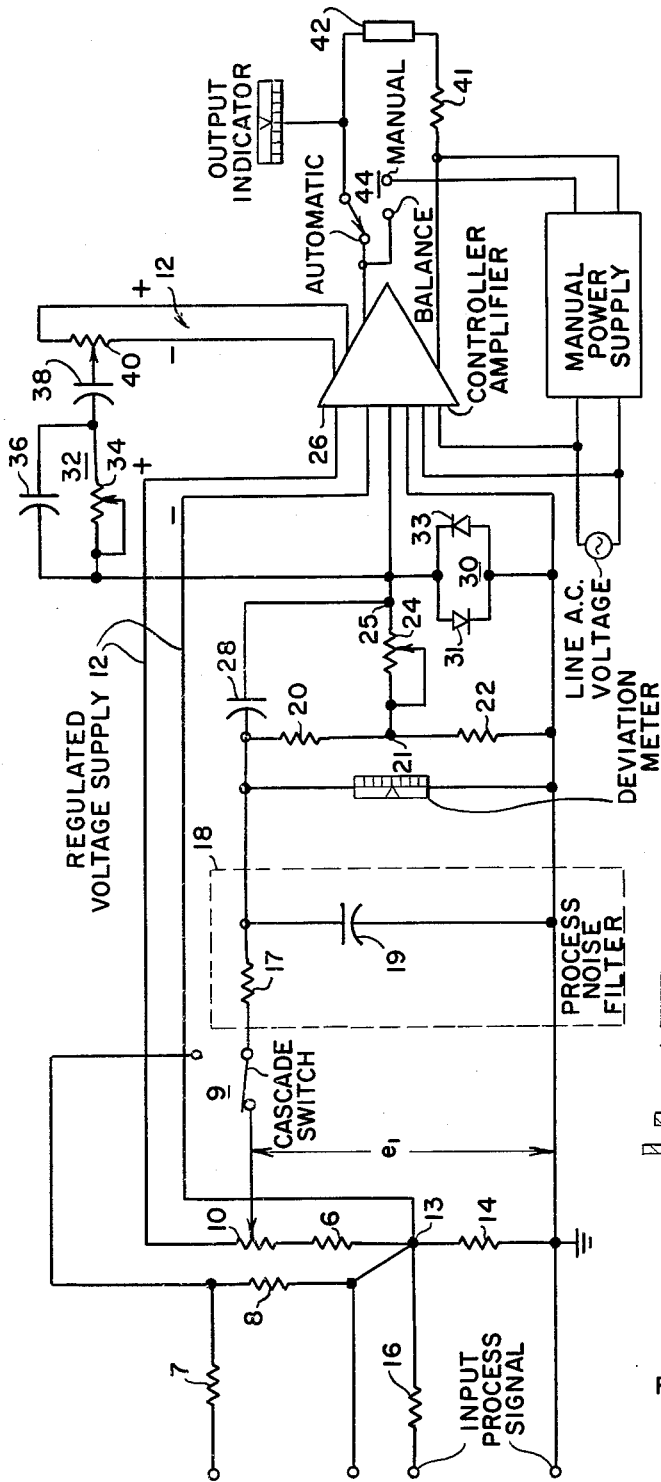
Figure 6:
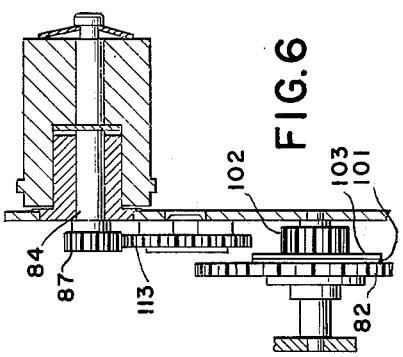
FIG. 6 is a cross-sectional view of the clutch utilized in the control mechanism of FIGS. 2, 4 and 5.

In FIG. 1, there is shown a diagram of a controller which suitably has incorporated therein, a set point potentiometer having a brush and slide wire assembly associated therewith which is moved by a control mechanism constructed in accordance with the principles of the invention. In the operation of the controller of FIG. 1, a process variable is compared with a control set point, and an output signal, suitably 10–50 ma., D.C., is produced to control the process at the set point by means of a suitable final element.

Referring now to FIG. 1, a voltage divider comprising a variable resistor 10, i.e., the set point potentiometer, a resistor 6, and a resistor 14 is connected between the positive terminal of a regulated voltage supply 12 (not shown) and common, the negative terminal of supply 12 being connected to the junction 13 of resistors 6 and 14. The process signal is applied through a resistor 16 and developed across resistor 14. The set point signal is taken from a point on set point potentiometer 10. An error voltage, $e_1$, consequently is developed as indicated. This error signal is filtered by a process noise filter 18 which comprises a series connected resistor 17 and a parallel connected capacitor 19, the error signal $e_1$ being applied to filter 18 through a cascade switch 9. Cascade switch 9 may be connected to receive the voltage developed across a resistor 8 and in this situation, the error signal $e_1$ is generated by the difference between the voltages across resistors 8 and 14. Resistors 7, 16 and 41 provide chosen voltage signals to test jacks. The filtered error signal, $e_1$, is applied across a voltage divider comprising resistors 20 and 22, the voltage appearing at the junction 21 of resistors 20 and 22 being applied as an input to an operational amplifier 26 through a variable resistor 24. The filtered error signal, $e_1$, is also applied as an input to amplifier 26 through a capacitor 28. The parallel combination 30 of oppositely poled diodes 31 and 33 is included connected between common and the input to amplifier 26 to limit the excursions in either direction of the error signal voltage applied thereto as will be further explained hereinbelow.

The voltage appearing at the input to amplifier 26 is also applied to the series arrangement of the parallel combination 32 of a variable resistor 34 and a capacitor 36, and a capacitor 38, capacitor 38 being connected by means of a slider to a point on a variable resistor 40 which is connected between the positive and negative terminals of regulated voltage supply source 12. The output of amplifier 26 may be transmitted to a load 42 through a three position switch 44, the three positions being automatic, balance and manual. The gain of amplifier 26 is determined by the setting of variable resistor 40. The output current of the circuit is proportional to the input error signal $e_1$ by the amount governed by this adustment. The degree of this gain action depends upon the value of the input error signal $e_1$ applied to capacitor 28 and the amount of negative feedback from variable resistor 40 applied to capacitor 38. Capacitors 28 and 38 are chosen to have fixed values respectively whereby the gain is governed by the value of the voltage taken from variable resistor 40 in accordance with the equation $$E_0 = e_1 \frac{C_{28}}{C_{38}} \left(\frac{1}{A}\right)$$

where A is the voltage at the slider associated with resistor 40.

By placing variable resistor 24 in parallel arrangement with capacitor 28, reset control action is enabled. Such action applies a corrective signal to the process as long as any deviation exists between process variable, and the voltage representing the set point value. Resistor 24 permits some direct current to flow whenever an error voltage, $e_1$ exists.

Operational amplifier 26 functions to make the feedback current equal and opposite to the input current due to error signal $e_1$. As long as an error signal exists, operational amplifier 26 produces a continuous feedback voltage change across resistor 40 to force this current to be equal. Since the output current is proportional to the feedback voltage from resistor 40, the circuit influences the process in tending to restore the value of the error signal $e_1$ to zero. When signal $e_1$ becomes zero, there is no current flow into point 25. It is seen that such reset control action is of an integral nature and integration ceases when the current flowing into point 25 is zero. The time constant of the reset function is determined by capacitor 28 and the resistance of the tapped portion of variable resistor 24.

Without rate action, the output of the circuit of FIG. 1 reflects step, i.e., rapidly changing inputs, as the input error multiplied by the gain. Rate action provides an amplifier transient gain characteristic such that the initial magnitude of the output signal is a suitable multiple of the gain factor such multiple suitably being about 10. With a step increase, the increase gain factor reduces gradually over a period of time determined by a rate time adjustment. It is seen that this rate action of the circuit of FIG. 1 is derivative in nature.

The rate action is provided by capacitors 36 and 38 and resistor 34. Capacitor 36 determines the rate gain limit and the combination of resistor 34 and capacitor 38 determines the rate time. Since capacitor 38 is chosen to have a fixed value, variation of the value of resistor 34 directly varies the rate time.

The transfer function of the circuit of FIG. 1 is in accordance with the expression $$E_{fb} = \frac{C_{28}}{AC_{38}} \left( e_1 + \frac{1}{R_{24}C_{28}} \int e_1 dt + R_{34}C_{28} \int \frac{de_1}{dt} \right)$$

wherein $E_{fb}$ is a voltage proportional to output current, and A is the voltage at the slider associated with variable resistor 40. Although, the transfer function equation indicates unlimited reset and rate gain, the rate gain is suitably limited to about 10.

Startup problems may occur when the circuit of FIG. 1 and the process being controlled are subject to large disturbances for a sufficient length of time to cause the circuit to become saturated. Saturation may occur when a process is shut down with instruments left on, or out of control for long periods of time. When the process is again started, the output of many control circuits remains in saturation until the process variable reaches the set point. If control action does not occur until the process variable reaches the set point, a large overshoot of the control point may result.

To insure that control action does take place before the process variable has attained the set point, diode limiters 31 and 33 are included to limit the voltage at point 25. With the voltage limited at point 25, capacitor 28 has a charge thereon. As the error sginal, $e_1$, decreases, the charge on capacitor 28 is in a polarity opposite to that of error signal $e_1$ and drives point 25 in the correct direction to bring the circuit out of saturation. The values of the circuit may be suitably chosen such that the circuit is driven out of saturation approximately one reset time constant before the process variable crosses the set point. If diodes 31 and 33 were not included in the circuit, a large input error signal $e_1$ would cause the input to amplifier 26, i.e., the voltage at point 25 to be equal to the error signal $e_1$ and therefore no charge would be pesent on capacitor 28. Consequently, the circuit would saturate at zero error signal. As the input error signal $e_1$ would decrease, the voltage at point 25 could not change until the input error signal $e_1$ would change polarity and control action would not take place until the process variable had crossed the set point.

In FIGS. 2, 3, 4, 5 and 6, there is shown a control mechanism constructed in accordance with the principles of the invention. It is to be realized that FIG. 2 which is an exploded view of the control mechanism, has been included for schematically illustrating the operation of the invention only and is not necessarily structurally identical to the views of FIGS. 4 and 5. In these figures, a frame 50 has mounted thereon a set point tape assembly 52 which may suitably include a d'Arsonval movement therein (not shown) for moving deviation indicator 52A, and a motor 53 to which there is applied the output of the process controlling computer 54. A manual control knob 56 is mounted on a control shaft, the shaft having a gear 59 thereon which drives a gear 60. Gear 60 is mounted on a shaft 61 which operates to drive a slide wire and brush assembly 62, assembly 62 comprising a slide wire potentiometer 64 and a brush 63 which is disposed at one terminus of shaft 61. Brush 63 is adapted to be rotated through substantially 360° through the rotation of gear 60 and shaft 61 and to make contact substantially throughout such 360° with a potentiometer 64, potentiometer 64 corresponding to the set point potentiometer 10 of FIG. 1. Slide wire potentiometer 64 is conveniently designated as the retransmitting slide wire and communicates directly with computer 54 and power supply 112 through appropriate leads. In the arrangement, there is also included a measurement slide wire and brush assembly 62A comprising a brush 63A and a slide wire potentiometer 64A. Both assemblies, 62 and 62A operate in registration whereby the same voltages appear on each brush. With this arrangement, the measurement slide wire is isolated from the computer.

At the other terminus of slide wire gear shaft 61, there are mounted a pair of limit cam members 66 and 68 having a pair of notches 67 and 69 respectively therein for receiving the rollers of cam follower arm actuators 71 and 73 of high limit and low limit switches 70 and 72. A limit switch such as switch 72 in addition to comprising an actuator 73 also includes a member 74 upon one end of which actuator 73 is pivotedly mounted. The other end of member 74 is affixed to frame 51. Cam members 66 and 68 are maintained in chosen positions by a cam screw 76. Member 75 of upper limit switch 70 and member 74 of lower limit switch 72 are tensioned toward each other by an interconnecting spring 78 which serves to bring them respectively back to the non-actuated position after they are actuated. Actuator 71 is tensionally affixed to a lug on member 75 by a spring 77, and actuator 73 is similarly affixed to a lug on member 74 by a spring 79. Switches 70 and 72 respectively are considered as being in the non-actuated position when their contactors 89 and 91 touch tap extension 90 and 92 on a frame 51. When a limit switch is in the actuated position, it causes the completion of a circuit (not shown) such as the bell, lamp circuit, etc.

Motor 53 is adapted to drive shaft 61 and consequently slide wire gear and brush assemblies 62 and 62A through a driven gear 110, a gear 80, an overriding clutch 82 and gear 60. The set point indicating tape 52 is driven by motor 53 through driven gear 110, gear 80, clutch 82, gear 60, an idler 113, gear 102 and gear 87 on tape drive shaft 84. Tape 52 is driven by a sprocket assembly generally designated by the number 100.

In considering the operation of the control mechanism of FIGS. 2 through 6, it is seen that the turning of knob 56 effects the rotation of slide wire gear 60 which simultaneously rotates slide wire and brush assemblies 62 and 62A and cam members 66 and 68.

Correspondingly, the actuation of drive motor 53 effects the turning of motor driven gear 110, gear 80, clutch 82, slide wire gear 60 and slide wire shaft 61, cam members 66 and 68, set point tape shaft 84 and set point tape 52, and control knob 56. In the situation where the drive motor is energized to cause the above set forth movements, if the set point knob were to be restrained in its rotation such as being stopped by an operator, slippage of overriding clutch 82 would occur whereby the control of drive motor 53 on the position of the brushes on the potentiometers is removed. In this connection clutch 82 is provided with metal and cork washers 101 and 103 respectively between a pinion gear 102 that meshes with gear 60 and clutch 82. When the motor 53 is running and the motion of knob 56 is restrained, the presence of the motor torque and the cork washer 103 causes clutch 82 to slip. Of course, if knob 56 were to be manually turned in a direction opposite to that which it is driven by motor 53, clutch 82 would also slip.

Cam screw 76 enables the restricting of the range over which the set point on the potentiometer can be varied through the rotation of motor 53. This is accomplished by loosening screw 76 and positioning cam members 66 and 68 to the desired high and low limits.

With the arrangement of cam members 66 and 68 and high and low limit switches 70 and 72, in accordance with the principles of the invention, a cam member may be so positioned whereby an indication will be given when a set point limit or alarm point is reached but where a brush can be driven beyond such set point or alarm point by not locking the roller of the actuator in its associated cam notch. There may also be accomplished with this arrangement, the stopping of the movement of the slide wire and brush assembly at the chosen limit by the locking of the roller on the actuator in the notch in its associated cam member. FIGS. 7 and 8 show arrangements of a limit switch where no positive stop is attained at a given point, FIG. 7 showing the situation that obtains when the limit switch is non-actuated and FIG. 8 showing the situation that obtains when a limit switch is actuated.

Referring now to FIG. 7, it is seen that when a limit switch such as upper limit switch 70 is not actuated, i.e., the roller of actuator 71 is not received in notch 67 of cam 66, contactor 89 is touching tap 90 extending from frame 51. Assuming that cam 66 is rotating in a counter clockwise direction as indicated by the arrow, when the roller on cam follower arm 71 is received in notch 67, it will not be held there but will ride past the notch as the cam continues to rotate. Similarly, when the limit switch is actuated by the receipt of the roller of actuator 71 in notch 67, thereafter as cam 66 continues to rotate in the counter clockwise direction, the roller of actuator 71 will not be retained in notch 67 when it is received therein and cam 66 will continue in its counter clockwise rotation. It is to be realized that in both situations, i.e., those shown in FIGS. 7 and 8, when the roller of the actuator is received in the cam notch, no positive stop is provided at the limit point but an indication is given that the limit point has been attained. Of course, when cam 66 is reversed in rotational direction, i.e., the clockwise direction, actuator 71 will fold under to an acute angle and spring 78 by its tensioning action will bring the switch back to the non-actuated position. It is to be noted that notch 67 is so configured that the bringing back of the switch into the non-actuated position occurs at the exact point of the cycle at which the notch is actuated when the rotational direction of the cam is reversed.

FIGS. 9 and 10 depict the non-actuated and actuated situations of a limit switch in cooperation with its associated cam which produces a positive stop at a limit point. Thus, in FIGS. 9 and 10, when the actuator of the limit switch is received in notch 67, rotation of cam 66 is halted. It is clear that the cam position of FIGS. 9 and 10 is the opposite aspect, i.e., the reverse of that of cam position, FIGS. 7 and 8. Such reversing is readily accomplished by removing cam screw 76 (FIGS. 2 to 6) and reversing a cam aspect on shaft 61. It is to be noted that the arrangement of the cams 66 and 68 and their respectively associated limit switches 70 and 72 is a one directional actuating arrangement, i.e., the cams operate the limit switches only in one direction.

The limit switches 70 and 72 are constructed such that the actuators 71 and 73 thereon respectively may be rotated 180° with respect to members 75 and 74 so that they do not engage their associated cams. By loosening cam screw 76, approximately one-fourth of a turn, cams 66 and 68 can be slipped on shaft 61 but are still rotatable with shaft 61 because a spring washer 114 is included therebetween. Thereafter, it is possible to engage an actuator and its cam individually to adjust its limit point without disturbing the position of the other cam. After the setting of the cams, cam screw 76 then may be retightened. In such individual setting of the cams, set point tape 52 may be advantageously utilized since the ratio between its comparatively long length and the distance covered in a rotation of a cam is highly advantageous.

While there has been shown a particular embodiment of this invention, it will, of course, be understood that it is not intended to be limited thereto since many modifications both in the circuit arrangements and in the instrumentalities employed therein may be made and it is therefore contemplated by the appended claims to cover any such modifications as fall within the true spirit and scope of the invention.

What is claimed as new and desired to be secured by Letters Patent of the United States is:

1. A mechanism capable of being both motor driven and manually actuated for effecting controlled movement of a member in a circular path comprising a rotatable shaft on which said member is mounted, clutch means for translating the motion of said motor to said shaft to rotate said member in accordance with the motion of said motor, rotatable manual control means, means coupling said manual control means to said shaft to translate movement of said manual control means to said shaft, said last named means also coupling said manual control means to said clutch means whereby the movement of said motor is coupled to said manual control means and means associated with said clutch means for effecting slippage of said clutch means upon the operation of said manual control means.

2. A mechanism capable of being both motor driven and manually actuated for effecting controlled movement of a member in a circular path comprising a rotatable shaft on which said member is mounted, clutch means for translating the motion of said motor to said shaft to rotate said member in accordance with the motion of said motor, rotatable manual control means, means coupling said manual control means to said shaft to translate the movement of said manual control means to said shaft, said last named means also coupling said manual control means to said clutch means whereby the movement of said motor is translated to said manual control means, means associated with said clutch means for effecting slippage of said clutch means upon the manual operation of said manual control means, cam means adapted to be rotated by the movement of said motor and said manual control means and limit switch means said limit switch being responsive to the rotational position of said cam means to produce limiting points of the range of movement of said member.

3. A mechanism capable of being both motor driven and manually actuated for effecting controlled movement of a member in a circular path comprising a rotatable shaft on which said member is mounted, clutch means comprising a first gear and a second gear independently rotatable upon a shaft, said first gear and said second gear being coupled to one another by means of a cork washer coaxial with and intermediate said first and second gears, said clutch means translating the motion of said motor to said shaft to rotate said member in accordance with the motion of said motor, rotatable manual control means, means coupling said manual control means to said shaft to translate the movement of said manual control means to said shaft, said last named means also coupling said manual control means to said clutch means whereby the movement of said motor is translated to said manual control means, means associated with said clutch means for effecting slippage of said clutch means upon the manual operation of said manual control means, a pair of like cams mounted on said shaft and having similarly contoured notches respectively on the periphery thereof, said cams being disposed on said shaft with their respective notches angularly displaced from each other a chosen amount, respective limit switches responsive to the position of said notches to produce limiting points of the range of movement of said member, each of said limit switches comprising a terminally disposed pivotally mounted follower arm, said follower arms being adapted to be moved along the periphery of said cams during rotation of said cams and to be received in said notches.

4. A mechanism as defined in claim 3 wherein said notches are so configured that in one aspect of a cam and in one direction of rotation of a cam, the receipt of a follower arm in its notch halts movement of said shaft and in the opposite aspect thereof, said receipt of a follower arm in a notch permits further movement of said shaft, the receipt of a follower arm in a cam causing the actuation of its associated limit switch.

5. A mechanism as defined in claim 4 and further including means for permitting the angular displacement of said notches to be varied.

6. A mechanism as defined in claim 5 and further including means for permitting the varying of said angular displacement by the changing of the relative position of only one of said notches on one of said cams.

7. A mechanism as defined in claim 6 in which said limit switches are spring tensioned and in which said switches are actuated in response to one direction of movement of their associated cam at a given point in a cam cycle of rotation and are deactuated at said given point in response to the opposite direction of movement.

8. A mechanism associated with a slide wire and brush assembly which is capable of being both motor driven and manually actuated for effecting controlled movement of said brush on said slide wire comprising a motor, a rotatable shaft on which said brush is mounted, clutch means comprising a gear, a pinion gear, and a cork washer intermediate and in intimate contact with said gears, for translating the motion of said motor to said shaft to rotate said brush in accordance with the motion of said motor, a rotatable manual control knob, means coupling said knob to said shaft to translate the rotational movement of said knob to said shaft, said last named means also coupling said knob to said clutch means whereby the movement of said motor is translated to said knob, means associated with said clutch means for effecting slippage of said clutch means upon the manual operation of said knob, a pair of like cams mounted on said shaft and having similarly contoured notches respectively on the periphery thereof, said cams being rotated by said shaft, said cams being disposed on said shaft with their respective notches angularly displaced from each other a chosen amount, respective limit switches associated with each of said cams, each of said limit switches comprising a terminally disposed pivotally mounted follower arm, said follower arms being adapted to be moved along the periphery of said cams during the rotation of said cams and to be received in said notches, said notches being so configured whereby in one aspect of a cam, the receipt of a follower arm in its notch halts movement of said shaft and in its opposite aspect, the receipt of said follower arm in its notch permits further movement of said shaft, the receipt of a follower arm in a notch causing the actuation of its associated limit switch, said limit switches being spring tensioned and being actuated only in response to one direction of movement of their associated respective cams.

References Cited by the Examiner
UNITED STATES PATENTS

| | | | |
|---|---|---|---|
| 2,483,950 | 10/49 | Watson et al. | 74—625 X |
| 2,724,288 | 11/55 | Benson | 74—625 |
| 2,753,736 | 7/56 | Mitchell | 74—625 |

DON A. WAITE, *Primary Examiner.*